United States Patent [19]

Keske

[11] 4,124,419
[45] Nov. 7, 1978

[54] SELF-BONDING VARNISH FOR MAGNET WIRE AND MAGNETS PRODUCED USING SAID

[75] Inventor: Robert G. Keske, Will County, Ill.

[73] Assignee: Standard Oil Company, Chicago, Ill.

[21] Appl. No.: 813,500

[22] Filed: Jul. 7, 1977

Related U.S. Application Data

[62] Division of Ser. No. 660,714, Feb. 23, 1976.

[51] Int. Cl.$^2$ ............... B05D 5/12; B65H 81/00; C09J 5/02; H01B 3/20
[52] U.S. Cl. ................................ 156/51; 29/605; 156/169; 156/306; 156/309; 242/7.03
[58] Field of Search ............ 242/7.03; 260/75 N; 428/377, 383; 427/116, 118, 120; 174/110 SR; 156/51, 169, 306, 309; 29/605

[56] References Cited

U.S. PATENT DOCUMENTS

| | | | |
|---|---|---|---|
| 3,697,471 | 10/1972 | Schmidt et al. | 260/75 N |
| 3,944,706 | 3/1976 | Czojka | 427/116 |

*Primary Examiner*—J.C. Cannon
*Attorney, Agent, or Firm*—William H. Magidson; Arthur G. Gilkes; William T. McClain

[57] ABSTRACT

Polyalkylenetrimellitate imide polyalkylenetrimellitate ester imides suitable for use as self-bonding varnish coatings for magnet wire, which can be produced by condensation of a trimellitic acid compound, a diprimary amine, an alkanol amine and a glycol.

4 Claims, No Drawings

SELF-BONDING VARNISH FOR MAGNET WIRE AND MAGNETS PRODUCED USING SAID

This invention relates to polyalkylenetrimellitate imide polyalkylenetrimellitate ester imides and their use as self-bonding magnet wire varnishes. This application is a division of Ser. No. 660,714 filed Feb. 23, 1976.

Magnet wire is an essential element of many electrical components, such as armatures, stators, coils, etc. Typically, the bare magnet wire is insulated by coating with one or more layers of a magnet wire enamel. N.E.M.A. standards require that the insulating enamal layer must be flexible and thermally stable under the conditions of use and that the coated wire must have specific mechanical properties. The thermal rating of magnet wire enamels is normally determined by ASTM D-2307 (1968). Magnet wire components used in small appliances and under the hood of automobiles generally require relatively high thermal ratings and correspondingly the most expensive enamels. Accordingly, various types of enamels are employed depending upon the thermal properties requied by the end use. The enameled magnet wire is fabricated into the desired elctrical component, dipped into a varnish and the varnish heat fused. The varnish is necessary to hold the wound magnet wire in place in the electrical component and enhances to some extent the insulating value of the finished component.

There has been considerable interest in avoiding the relatively time consuming varnish dipping step. Accordingly, industry would like self-bonding magnet wire varnishes where (1) the varnish can be applied directly to the unwound enameled magnet wire, (2) the varnish layer provides a tack-free top coating on the enameled wire which maintains its integrity during fabrication (winding, assembly, etc.), (3) the varnished wire passes the N.E.M.A. standards for enameled wire and (4) the varnish layer can be heat fused after fabrication to form essentially the same unitary electrical components as the prior art process. The advantage of a self-bonding varnish is apparent when one considers the speed at which the wire can be coated with varnish as opposed to dipping and handling numerous fabricated parts.

Self-bonding epoxy varnishes have been developed. However, these expoy varnishes are limited to end uses having a rating of 130° C. or below. Above about 130° C., the epoxy breaks down. In commonly assigned application Serial No. 493,558 of Czajka, filed Aug. 1, 1974, and now U.S. Pat. No. 3,944,706, poly(ethylenetrimellitate imides) are disclosed as suitable self-bonding magnet wire varnishes for class 155 rated (class F) enamels or higher rated enamels. While the poly(ethylenetrimellitate imide) varnishes of Czajka have excellent properties, the coatings have a tendency to surface craze on elongation of the coated wire. Further, there has been some interest in top coat varnishes similar to the Czajka polymers which bond to a unitary structure at somewhat lower temperatures. In commonly assigned application Ser. No. 660,716 of Keske et al, filed on even date and now U.S. Pat. No. 4,012,556, there is described a new class of self-bonding poly(ethylenetrimellitate ester imide) coatings based on the reaction product of a trimellitic acid compound, a glycol and an aliphatic diprimary amine. While these coatings, particularly those based on reaction products of a trimellitic acid compound, ethylene glycol and aliphatic diamine do not have a tendency to craze on coated wire, the products based on ethylenediamine have a higher bonding temperature than the Czajka polymer. The products based on higher diprimary amines, such as hexamethylenediamine, bond to unitary structures at somewhat lower temperatures. However the coatings based on the higher diamines have the disadvantage that the bond strength of the varnished magnet wire decreases undesirably at higher temperatures. In substance, there is a trade off between bonding temperature of the varnished wire vs. the strength of the bond at higher temperatures. The lower the bonding temperature, the lower the temperature at which the bond is subsequently broken. Accordingly, there is a need for self-bonding varnishes which can be bonded at a lower temperature than the aforesaid poly(ethylenetrimellitate imides) of the Czajka patent but maintain their bond strength at a higher temperature than the poly(ethylenetrimellitate ester imides) of the Keske et al invention (particularly those based on ethylene glycol and hexamethylenediamine). There is also a need for self-bonding varnishes of the Keske et al. type which do not have a tendency to craze on elongation of the coated wire.

The general object of this invention is to provide a new class of polymers suitable for use as self-bonding magnet wire varnishes. The specific object is to provide magnet wire bearing a self-bonding varnish top coat for polyester, polyester imide, polyimide and polyamide imide enamel subbing layers. Other objects appear hereinafter.

We have now found that the objects of this invention can be attained by employing a polyalkylenetrimellitate imide polyalkylene trimellitate ester imide having a mole ratio of from about 1 to 19 to 19 to 1 of units A and B wherein A and B have the structures

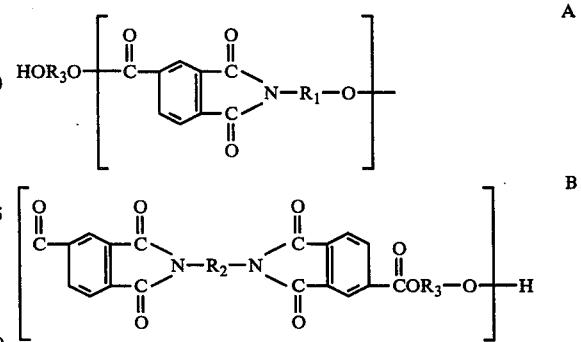

wherein $R_1$, $R_2$ and $R_3$ are independently divalent alkylene radicals of from 2 to 12 carbon atoms.

The polymers of this invention have excellent thermal properties, can be applied directly to enameled or subbed magnet wire, dried to a non-tacky coating and subsequently elongated without aesthetically undesirable crazing. The magnet wire coated with the polymers of this invention pass the N.E.M.A. standards and the varnishes bond on heating the fabricated elements to the desired unitary structure. For simplicity the articles of this invention can be viewed as magnet wire bearing a self-bonding top coat varnish comprising a polyalkylenetrimellitate imide polyalkylenetrimellitate ester imide. However, the magnet wire usually comprises one or more layers of one or more relatively thermally stable subbing layers, such as one or more polyester, polyimide, polyester imide or polyamide imide layers.

For the purpose of this invention the I.V. is measured at 25° C. and 0.5% w/v in 60/40 w/w phenol/1,1,2,2-tetrachloroethane.

The polymers of this invention have an I.V. (inherent viscosity) of at least 0.3 dl/g, preferably at least 0.4 dl/g. If the I.V. is below 0.3 the coating lacks the desired physical properties and the varnished magnet wire cannot be processed easily.

In general, the polymers of this invention can be produced by reacting a trimellitic acid compound (trimellitic anhydride or trimellitic acid) with one or more diprimary amines, one or more glycols and one or more alkanol amines. For use as self-bonding varnish coatings, the diprimary amines, glycols and alkanol amines are preferably aliphatic (alkylene groups of 2 to 12 carbon atoms). The ratio of A units to B units in the polymer is dependent primarily on the ratio of alkanol amine to diamine since the glycol is generally used in an excess to facilitate polymerization (e.g. maintain the reactants in a melt). Since each primary amino group can react with two acyl groups of the trimellitic acid compound, one mole of diamine and 2 moles of trimellitic acid compound must be used to produce each B unit and one mole of trimellitic acid compound and one mole alkanol amine must be used to produce each A unit. Accordingly, the ratio of A units to B units in the polymer can be determined readily by comparing the alkanol amine to diamine ratio, e.g. a 1 to 1 mole ratio of alkanol amine to diamine results in a 1:1 unit ratio of A to B.

As indicated above, in general, it is preferable to use an excess of glycol since the vicinal acyl groups of the trimellitic acid compound react preferably with the primary amino groups to form imide groups and any excess primary amino groups react with non-vicinal carboxylic acid groups of the trimellitic acid compound in competition with the hydroxy groups of the glycol and/or alkanol amine. Accordingly, the particular mole ratio of these reactants is not critical to the production of the desired polymer. As indicated above, the ratio of A units to B units can range from about 1:19 to 19:1 by adjusting the mole ratio of alkanol amine to diamine to from 1:19 to 19:1. Since the bond strength at high temperatures decreases as the concentration of diamine in the polymer increases, it is preferred that the A:B ratio is at least 1.

All the reactants can be condensed simultaneously at about 90°–290° C. and the unreacted glycol distilled off. If desired, the bis-imide can be formed in one stage as described in Bolton et al. U.S. Pat. No. 3,051,724 which is incorporated by reference and N-hydroxyalkyltrimellitic acid imide formed in a separate stage as described in Kolb U.S. Pat. No. 3,060,191 or Golinkin et al U.S. Pat. No. 3,880,812, which are incorporated by reference. The bis-imide and N-hydroxyalkyltrimellitic acid imide can then be condensed with glycol at 90°–290° C. to produce a polymer having the aforesaid units of A and B. In this case the units A and B are again controlled by the ratio of diamine to alkanol amine. In order to maintain the reactants in a fluid condition, it is extremely desirable to carry out the reaction in the presence of a tertiary amine, such as triethylamine or tripropylamine. In any case, the reaction is terminated after the polymer reaches an I.V. of at least 0.3, preferably 0.4, provided the condensation system promotes attainment of the desired I.V.

The reaction or reactions can be carried out in the presence of a suitable esterification catalyst such as antimony trioxide, antimony tributoxide, tetrabutyl titanate, tetra-isopropyl titanate, stannous salts, such as stannous laurate and various organotin compounds, such as dibutyltin maleate, dibutyltin dilaurate, dibutyltin diacetate, tributyltin adipate, dibutyltin salicylate, dibutyltin dichloride, etc. All of these catalysts can be used in concentration of about 0.01 to 2 parts by weight (preferably 0.1 to 0.5 parts by weight) per 100 parts by weight of the reactants.

The aliphatic glycols useful in this invention include ethylene glycol, 1,2-propylene glycol, trimethylene glycol, tetramethylene glycol, dodecamethylene glycol, etc. Of these, ethylene glycol is preferred since it provides polymers having a somewhat harder finish. Further, in view of its lower molecular weight, excess ethylene glycol can be removed from the reaction mixture more readily than the higher molecular weight glycols as the reaction is completed. Other things being equal, the more carbon atoms in the alkylene glycol the lower the bonding temperature of the polymer and the lower the N.E.M.A. rating of the polymer.

The diprimary amines useful in this invention include ethylenediamine, 1,2-diaminopropane, 1,3-diaminopropane, 1,4-diaminobutane, 1,6-diaminohexane, 1,12-diaminododecane, etc. In general, other things being equal, as the chain length of the diamine increases the melting point of the polymer decreases, the heat fusion temperature of the polymer decreases and the N.E.M.A. rating of the polymer decreases.

Suitable alkanol amines for producing the N-hydroxyalkyl trimellitic acid imide and copolymeric products of this invention include ethanolamine, isopropanolamine, 3-hydroxypropylamine, 4-hydroxybutylamine, 6-hydroxyhexylamine, 8-hydroxyoctylamine, 12-hydroxydodecylamine, etc.

If desired, one or more glycols, one or more diamines and one or more alkanol amines can be used to balance the physical properties of the polymers.

The preferred polymers of this invention are based on hexamethylenediamine, ethylene glycol and ethanolamine. The resultant self-bonding varnishes attain maximum bonding strength at a temperature below homopolymeric poly(ethylenetrimellitate imide) and maintain their bonding strength at a higher temperature than the products of the Keske et al application based on ethylene glycol and alkylenediamine as the sole component other than trimellitic acid compound.

Substantially any one or more thermally stable magnet wire enamels can be used as subbing layers for the self-bonding poly(alkylenetrimellitate imide polyalkylenetrimellitate ester imide) top coats. As indicated above, suitable subbing layers include polyesters, polyesterimides, polyamideimides, polyimides, etc.; see, for example, U.S. Pat. Nos. 3,022,200 of Koener, et al.; 3,371,009 of Traynor, et al.; 3,428,486 of George; 3,475,212 of Bach, all of which patents are incorporated by reference. A particular useful combination is to employ a polyester layer or layers directly in contact with the magnet wire and higher thermally rated enamels as the outer enamel layer. For example, it is desirable to have a polyester enamel subbing layer in direct contact with the magnet wire and either a polyimide or polyamideimide enamel layer in direct contact with the polyester layer and the poly(alkylenetrimellitate imide polyalkylenetrimellitate ester imide) top coat. Of course, each of these layers may be formed by one or more applications of the particular polymer.

The thermally stable enamels and the poly(alkylenetrimellitate imide polyalkylenetrimellitate ester imides) can be applied to magnet wire by passing the wire through the polymer solution, through a suitable die and then through an oven maintained at an elevated temperature to cure and/or dry the resins on the wire. Where desired, the wire may be passed through the polymer solution and dies a number of times and through the oven after each pass through the polymer solution. In this way a thicker polymer buildup is obtainable than can be obtained with only a single pass through a polymer solution. Typically, the die provides a clearance of from about 2 to 4 mils around the wire. The speed at which the wire is passed through the polymer solution and the temperature at which the oven is maintained depends upon the particular polymer solution employed, the buildup of polymer desired, and length of the oven in which the coated wire is cured and/or dried and the molecular weight of the polymer used in the coating operation. The various parameters for applying the thermally stable enamels are well known by practitioners in this industry and particularly efficacious combinations of enamels and operating conditions can be determined by routine experimentation.

The self-bonding polymers of this invention are preferably applied from a 10 to 30 percent by weight solution of an organic solvent such as cresylic acid or metacresol or mixtures of these with xylenes, at a rate of 10 to 1000 feet per minute and dried at a temperature of 250° to 500° C. before winding the wire and fabricating the wound magnet into the desired electrical component, such as a coil.

After fabrication of the electrical component, the thermoplastic poly(alkylenetrimellitate imide polyalkylenetrimellitate ester imide) coatings can be bonded together at a temperature of 150 to 300° C. or higher for approximately 60 minutes to 5 minutes to form a unitary structure. In general, the higher the fusion temperature the shorter the heating time.

EXAMPLE I

Six-hundred sixty-three and one-half grams trimellitic anhydride and three grams dibutyltin maleate were placed in a three-liter, three-necked round bottom flask equipped with a mechanical stirrer, reflux condenser and addition funnel. A mixture of 100.1 grams hexamethylene diamine (0.863 moles), 106.2 grams ethanolamine (1.75 moles) and 250 grams ethylene glycol (4 moles) was rapidly added to the stirred reactants over a five minute period from the addition funnel. After the addition funnel was replaced with a nitrogen inlet tube and the reflux condenser was replaced with a distillation head and condenser, the temperature of the spherical heating mantle surrounding the flask was set at 590° F. while a slow stream of nitrogen was passed through the flask. Two hundred eighty ml. of distillate was collected over a period of about 3 hours. The nitrogen sparge was turned off and a vacuum of 15 inches mercury was drawn on the system for 10 minutes followed by high vacuum (0.5 mm Hg) for 45 minutes. After the viscous polymer was cooled and ground, the polymer had an I.V. of 0.47 dl/g (0.5% 60:40 phenol:tetrachloroethane at 25° C.).

One hundred fifty grams of the polyethylenetrimellitate imide polyethylene hexamethylenetrimelletate ester imide was dissolved in 450 grams cresylic acid by heating at 100° C. for about 45 minutes. After 112 grams xylene was added to the stirred solution, the solution was filtered hot through a coarse porous plate funnel. The cooled 21% solids solution had a Gardner viscosity of 25 stokes.

Eighteen gauge (0.0403 inch diameter) copper AWG wire, annealed at 750° F. under nitrogen, was coated in a G.E. laboratory Model Type M Wire Tower by passing the annealed wire at 40 to 50 feet per minute through a 30% solids room temperature bath of an ethylene glycol/trishydroxyethyl isocyanurate terephthalate polyester (Isonel 200 XWE 490) in cresylic acid and dried in a two-stage 15-foot oven where the first 7½ feet of the oven was maintained at 500° F. and the second half of the oven was maintained at 850° F. Four coats of polyester were applied in this manner thereby increasing the wire diameter by 1.1 mils. Two layers of a trimellitic anhydride/methylenebisaniline/methylenebisaniline diisocyanate amideimide polymer of the type described in Hanson et al Application Ser. No. 348,868 filed Apr. 4, 1973, now U.S. Pat. No. 3,847,878, which is incorporated by reference, were applied in essentially the same manner by passing the polyester coated wire through a 25% solids room temperature bath of the amideimide polymer in a 2:1 weight ratio of N-methylpyrrolidone:xylene and dried in the two-stage oven at 500° F. and 850° F. thereby increasing the enamel layer diameter an additional 0.8 mils. Two bond coats of polyethylenetrimellitate imide polyethylenehexamethylene trimellitate ester imide solution prepared in the preceding paragraph having an inherent viscosity of about 0.47 dl/g was applied in essentially the same manner by passing the enamel copper wire through a room temperature 21° solids bath of the polyethylenetrimellitate imide polyethylenehexamethylene trimellitate ester imide at 45 ft/min. and dried at 500° F. and 850° F. to increase the wire diameter 0.6 to 0.8 mils.

The magnet wire was wound, bonded at 175° C. for one hour and tested according to N.E.M.A. magnet wire standard MW-1000-1973. Magnet wire was also coated with polyethylenetrimellitate imide homopolymer, having an I.V. of 0.45 dl/g, polyethylenehexamethylene trimellitate ester imide having an I.V. of 0.53 dl/g based on ethylene glycol and hexamethylenediamine. The polyethylene trimellitate homopolymer was bonded for one hour at 225° C. while the polyethylenehexamethylene trimellitate ester imide based on ethylene glycol and hexamethylenediamine was bonded at 175° C. for one hour. The results are set forth below in Table I.

TABLE I

| Sample | Bond Strength lbs/at | | | | |
|---|---|---|---|---|---|
| | RT | 100° C | 125° C | 150° C | 175° C |
| PETM | 23 | N.R. | N.R. | 21 | 16 |
| PETM-H | 21 | 11 | 7 | 3 | 2 |
| Polymer of This Example | 19 | 16 | 18 | 8 | 2 |

In the above table PETM stands for polyethylenetrimellitate imide, PETM-H stands for polyethylenehexamethylene trimellitate ester imide based on ethylene glycol, and a mole ratio of ethanol amine to hexamethylenediamine of 2:1 and NR indicates that the sample was not tested.

The above table indicates that magnet wire coated with the polymers of this invention can be bonded at a lower temperature than polyethylenetrimellitate imide homopolymer and yet maintain bond strength at a higher temperature than polyethylenehexamethylene trimellitate ester imide based on ethylene glycol and hexamethylenediamine. On elongation of the magnet wire coated with the polymers of this invention there was no crazing.

The magnet wire coated with the polymer of this invention passed the N.E.M.A. standards for class F top coat varnished.

We claim:

1. The method of producing a magnet wire bearing a continuous self-bonded varnish top coat comprising applying a polyalkylenetrimellitate imide polyalkylenetrimellitate ester imide, having a ratio of from about 1:19 to 19:1 of units A and B wherein A and B have the structures:

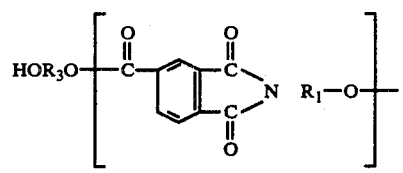

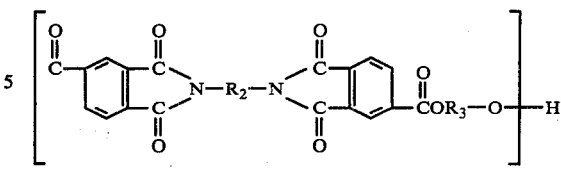

and $R_1$, $R_1$ and $R_3$ are independently divalent alkylene radicals, varnish top coat to a magnet wire bearing at least one enamel subbing layer selected from the group consisting of a polyester, polyesterimide, polyimide and polyamide-imide, drying the polyalkylenetrimellitate imide polyalkylenetrimellitate ester imide coating, winding the wire to form a wound magnet, fabricating the wound magnet into an electrical component and bonding the polyalkylenetrimellitate imide polyalkylenetrimellitate ester imide varnish together to form a unitary electrical structure.

2. The process of claim 1 wherein the varnish top coat has an I.V. of at least 0.3 dl/g and $R_3$ comprises ethylene.

3. The process of claim 2, wherein $R_1$ comprises ethylene and the A:B ratio is at least 1.

4. The process of claim 3 wherein $R_2$ comprises hexamethylene.

* * * * *